(12) United States Patent
Huang et al.

(10) Patent No.: US 12,209,338 B2
(45) Date of Patent: Jan. 28, 2025

(54) PREPARATION METHOD OF SM NON-WOVEN FABRICS FOR ROOF ANTI-SLIP

(71) Applicant: DONGYING JOFO FILTRATION TECHNOLOGY CO., LTD., Dongying (CN)

(72) Inventors: Wensheng Huang, Dongying (CN); Yujia Liu, Dongying (CN); Guodong Xie, Dongying (CN); Weidong Zhang, Dongying (CN); Jinjing Qiu, Dongying (CN); Weifeng Sun, Dongying (CN); Zhiguo Huang, Dongying (CN)

(73) Assignee: DONGYING JOFO FILTRATION TECHNOLOGY CO., LTD., Dongying (CN)

( * ) Notice: Subject to any disclaimer, the term of this patent is extended or adjusted under 35 U.S.C. 154(b) by 0 days.

(21) Appl. No.: 18/570,620

(22) PCT Filed: Apr. 17, 2023

(86) PCT No.: PCT/CN2023/088578
§ 371 (c)(1),
(2) Date: Dec. 14, 2023

(87) PCT Pub. No.: WO2023/216810
PCT Pub. Date: Nov. 16, 2023

(65) Prior Publication Data
US 2024/0263371 A1    Aug. 8, 2024

(30) Foreign Application Priority Data
May 10, 2022  (CN) .......................... 202210503842.3

(51) Int. Cl.
*B29C 48/21*    (2019.01)
*B29C 48/00*    (2019.01)
*B32B 37/00*    (2006.01)
*D01D 1/04*    (2006.01)
*D01D 1/10*    (2006.01)
*D01D 5/08*    (2006.01)
*D01D 5/098*    (2006.01)
(Continued)

(52) U.S. Cl.
CPC ....... *D04H 1/4374* (2013.01); *B29C 48/0018* (2019.02); *B29C 48/0022* (2019.02); *D01D 1/106* (2013.01); *D01D 5/0985* (2013.01); *D01F 1/106* (2013.01); *D01F 6/06* (2013.01); *D04H 1/4291* (2013.01); *D04H 1/435* (2013.01); *D04H 1/43825* (2020.05); *D04H 1/56* (2013.01); *D04H 1/587* (2013.01); *D04H 1/593* (2013.01); *D04H 3/16* (2013.01); *D06M 11/72* (2013.01); *D06M 13/262* (2013.01); *D06M 15/11* (2013.01); *D06M 15/3562* (2013.01); *E04D 5/12* (2013.01); *B29C 2793/00* (2013.01); *D06M 2101/20* (2013.01); *D06M 2101/32* (2013.01); *D10B 2321/021* (2013.01); *D10B 2321/022* (2013.01); *D10B 2401/00* (2013.01); *D10B 2505/20* (2013.01)

(58) Field of Classification Search
CPC . B29C 48/0018; B29C 48/0022; B29C 48/21; B29C 2793/00; B32B 37/00; D01D 1/04; D01D 1/106; D01D 5/08; D01D 5/0985; D01D 5/12; D01D 7/00; D01F 1/10; D01F 6/06; D02J 1/22; D02J 13/00; D04H 3/007; D04H 3/16; D04H 5/06; D10B 2321/022
USPC .......... 264/112, 115, 145, 169, 171.1, 210.6, 264/210.8, 211, 211.12, 211.14; 156/62.4, 244.11
See application file for complete search history.

(56) References Cited

U.S. PATENT DOCUMENTS 5,366,792 A    11/1994  Shirayanagi et al.
5,667,750 A *   9/1997  Nohr ........................ D04H 3/16
                                                    264/210.8

FOREIGN PATENT DOCUMENTS

CN    1222068 A    7/1999
CN    102903878 A    1/2013
(Continued)

OTHER PUBLICATIONS

Translation of CN 110965208 A (published on Apr. 7, 2020).*
(Continued)

*Primary Examiner* — Leo B Tentoni
(74) *Attorney, Agent, or Firm* — BAKERHOSTETLER

(57) ABSTRACT

The present application discloses a preparation method of SM non-woven fabrics for roof anti-slip, which belongs to the technical field of roofing materials, comprising preparing spunbond non-woven fabric raw materials, preparing spunbond non-woven fabrics, preparing meltblown non-woven fabric raw materials, preparing primary SM non-woven fabrics, and post-processing; the spunbond non-woven fabric raw materials are prepared by uniformly mixing polypropylene with a low melt flow index, polypropylene with a high melt flow index, sodium alginate, antioxidant 1010, zinc stearate, ultraviolet absorber UV-531, polyvinyl alcohol, reinforcing agent, adhesive agent, and nano titanium dioxide. The present application can avoid the problem that the SM non-woven fabrics cannot be fully bonded together and are easy to delaminate when being combined, can also solve the problem of fabric breakage during high-speed production, and can also improve the wear resistance, strength, and stiffness of SM non-woven fabrics. The prepared SM non-woven fabrics have low production costs, are easy to recycle, and have good environmental performances.

6 Claims, No Drawings

(51) Int. Cl.
| | |
|---|---|
| *D01D 5/12* | (2006.01) |
| *D01D 7/00* | (2006.01) |
| *D01F 1/10* | (2006.01) |
| *D01F 6/06* | (2006.01) |
| *D02J 1/22* | (2006.01) |
| *D02J 13/00* | (2006.01) |
| *D04H 1/4291* | (2012.01) |
| *D04H 1/435* | (2012.01) |
| *D04H 1/4374* | (2012.01) |
| *D04H 1/4382* | (2012.01) |
| *D04H 1/56* | (2006.01) |
| *D04H 1/587* | (2012.01) |
| *D04H 1/593* | (2012.01) |
| *D04H 3/007* | (2012.01) |
| *D04H 3/16* | (2006.01) |
| *D04H 5/06* | (2006.01) |
| *D06M 11/72* | (2006.01) |
| *D06M 13/262* | (2006.01) |
| *D06M 15/11* | (2006.01) |
| *D06M 15/356* | (2006.01) |
| *E04D 5/12* | (2006.01) |
| *D06M 101/20* | (2006.01) |
| *D06M 101/32* | (2006.01) |

(56) References Cited

FOREIGN PATENT DOCUMENTS

| | | |
|---|---|---|
| CN | 106536804 A | 3/2017 |
| CN | 107447362 A | 12/2017 |
| CN | 107447372 A | 12/2017 |
| CN | 110791882 A | 2/2020 |
| CN | 110965208 A | 4/2020 |
| CN | 111533995 A | 8/2020 |
| CN | 111575910 A | 8/2020 |
| CN | 111593484 A | 8/2020 |
| CN | 113355806 A | 9/2021 |
| CN | 114875573 A | 8/2022 |
| JP | H 05-163648 A | 6/1993 |

OTHER PUBLICATIONS

Translation of CN 114875573 A (published on Aug. 9, 2022).*
Chinese Office Action from Chinese Patent Application No. 202210603842.3, dated Jan. 5, 2023, 22 pages including English language translation.

* cited by examiner

PREPARATION METHOD OF SM NON-WOVEN FABRICS FOR ROOF ANTI-SLIP

CROSS-REFERENCE TO RELATED APPLICATION

The present application claims priority to Chinese Patent Application No. 202210503842.3 filed on May 10, 2022, the entire disclosure of which is incorporated by reference herein.

TECHNICAL FIELD

The present application relates to the technical field of roofing materials, specifically, to a preparation method of SM non-woven fabrics for roof anti-slip.

BACKGROUND ART

SM non-woven fabrics, which belong to non-woven fabric composites, are composite products of spunbond non-woven fabrics and meltblown non-woven fabrics. SM non-woven fabrics have the advantages of high strength, good filtration performance, good breathability, non-adhesive agent, no toxicity and the like. Currently, it is mainly used in medical and health labor protection products such as roofs, surgical gowns, surgical hats, protective clothing, scrub attire, handbags.

Compared with the use of spunbond non-woven fabrics alone, when SM non-woven fabrics are mainly used as anti-slip materials in roofing materials, they have the following advantages: uneven surface, good anti-slip effect, and anti-UV function by adding anti-aging masterbatch to avoid the fabric pulverization caused by long-term sunlight exposure. There are two existing processes for SM non-woven fabrics. One process is SM hot rolling, wherein materials processed by this process have high strength, however, due to the complete integration of the materials through the rolling mill, the surface of the fabrics is smooth, and the anti-slip effect can be achieved only by the rolling point of the spunbond rolling mill, which has a little anti-slip effect. Another process is to spray the meltblown layer on the spunbond layer without hot rolling by the rolling mill, however, due to the rapid crystallization during the process of the meltblown mesh laying, the meltblown layer and spunbond layer cannot be fully bonded together and are easy to delaminate when being combined, which results in fabric breakages during high-speed production in the post-processing process due to the different properties such as strengths of the two types of non-woven fabric materials and the inconsistent tensile tensions. In addition, due to the poor wear resistance, low strength, and insufficient stiffness of meltblown non-woven fabrics, SM non-woven fabrics are poor in wear resistance, strength, and stiffness.

In order to solve the above-mentioned problems, the most commonly used method at present is to bond two types of non-woven fabrics together by using hot-pressure bonding. However, this method will affect the anti-slip effect of the prepared SM non-woven fabrics and it cannot fundamentally solve the problem that the two types of non-woven fabrics have different properties such as strengths, and inconsistent tensile tensions, and fabric breakages are prone to occur during high-speed production, and also cannot solve the problems of poor wear resistance, strength, and stiffness of SM non-woven fabrics.

SUMMARY

Given the deficiencies of the existing technology, the present application provides a preparation method of SM non-woven fabrics for roof anti-slip, which can avoid the problem that SM non-woven fabrics cannot be fully bonded together and are easy to delaminate when being combined, and can also solve the problem that the two types of non-woven fabrics have different properties such as strengths, and inconsistent tensile tensions, and fabric breakages are prone to occur during high-speed production. At the same time, the preparation method can also improve the wear resistance, strength, and stiffness of SM non-woven fabrics, and the prepared SM non-woven fabrics have low production costs, are easy to recycle, and have good environmental performances.

To Solve the Above Technical Problems, the Technical Solutions Adopted by the Present Application are as Follows:

A preparation method of SM non-woven fabrics for roof anti-slip comprises preparing spunbond non-woven fabric raw materials, preparing spunbond non-woven fabrics, preparing meltblown non-woven fabric raw materials, preparing primary SM non-woven fabrics, and post-processing.

The spunbond non-woven fabric raw materials are prepared by uniformly mixing polypropylene with a low melt flow index, polypropylene with a high melt flow index, sodium alginate, antioxidant 1010, zinc stearate, ultraviolet absorber UV-531, polyvinyl alcohol, reinforcing agent, adhesive agent, and nano titanium dioxide:

The polypropylene with a low melt flow index has a melt flow index of 25 to 35 g/10 min;
The polypropylene with a high melt flow index has a melt flow index of 800 to 900 g/10 min;
Wherein, the weight ratio of the polypropylene with a low melt flow index, polypropylene with a high melt flow index, sodium alginate, antioxidant 1010, zinc stearate, ultraviolet absorber UV-531, polyethylene glycol 6000, reinforcing agent, adhesive agent, and nano titanium dioxide is (120 to 130):(7 to 9):(3 to 5):(0.5 to 0.7):(2 to 4):(1 to 2):(6 to 8):(7 to 9):(3 to 4):(2 to 4).

The reinforcing agent is prepared by the method as follows: placing hexagonal boron nitride powder, light calcium carbonate, hexadecyl trimethyl ammonium bromide, and sodium hexametaphosphate in a ball mill for ball milling at a ball-to-material ratio of (20 to 25):1, a ball milling speed of 200 to 300 rpm, and a temperature of 60° C. to 65° C. for 20 to 30 min, and obtaining a primary reinforcing agent after the ball milling ends, subjecting the primary reinforcing agent to vacuum heating treatment at a vacuum degree of 100 to 120 Pa, and a temperature of 70° C. to 80° C., and obtaining the reinforcing agent at the end of the vacuum heating treatment:

wherein, the weight ratio of hexagonal boron nitride powder, light calcium carbonate, hexadecyl trimethyl ammonium bromide, and sodium hexametaphosphate is (20 to 22):(8 to 10):(3 to 5):(7 to 10).

The adhesive agent is prepared by the method as follows: adding polyvinyl alcohol 2488, cyclodextrin, hydroxyethyl cellulose, and cationic polyacrylamide into deionized water, stirring at a stirring speed of 200 to 240 rpm for 40 to 50 min at 60° C. to 65° C., then carrying out spray drying with an inlet air temperature controlled at 140° C. to 160° C., and an outlet air temperature controlled at 60° C. to 70° C., and obtaining the adhesive agent after vacuum spray drying;

the cationic polyacrylamide has a molecular weight of 5 to 6 million, and a degree of ionicity of 15% to 20%;

wherein, the weight ratio of polyvinyl alcohol 2488, cyclodextrin, hydroxyethyl cellulose, cationic polyacrylamide, and deionized water is (30 to 35):(3 to 4):(5 to 7):(1 to 3):(50 to 55).

The spunbond non-woven fabrics are prepared as follows: adding spunbond non-woven fabric raw materials into a mixing device, and obtaining spunbond non-woven fabrics through melt extruding, melt filtering, die head spinning, mesh laying, hot rolling, liquid loading, drying, coiling and winding, and slitting;

in the die head spinning step, the pressure of an air box is 2800 to 3000 Pa, the fan speed ratio is 80% to 82%, and the temperature of the upper and lower cold air is 22° C. to 25° C.;

in the hot rolling treatment step, the temperature of the embossing roller is 155° C. to 160° C., the temperature of the smooth roller is 140° C. to 145° C., the speed of the mesh belt is 630 to 650 m/min, and the hot rolling pressure is 80 to 90 daN/cm.

The meltblown non-woven fabric raw materials are prepared as follows: uniformly mixing polypropylene, polybutylene terephthalate, polyethylene, nano silicon dioxide, coconut monoisopropanolamide, modified compatibilizer, and tackifier to obtain meltblown non-woven fabric raw materials;

the modified compatibilizer is prepared by the method as follows: adding polypropylene with a high melt flow index, maleic anhydride, and methyl methacrylate into a mixer for low-temperature treatment with a speed controlled at 250 to 280 rpm, and a temperature controlled at 2° C. to 5° C. for 20 to 25 min, adding dicumyl peroxide and 1-dodecanethiol, and then raising the temperature to 40° C. to 45° C. at a heating rate of 1 to 1.2° C./min, stirring at 40° C. to 45° C. for 15 to 20 min, adding 2-hydroxyethyl methacrylate and sodium persulfate, then raising the temperature to 50° C. to 55° C. at a heating rate of 0.8 to 1° C./min, stirring at 50° C. to 55° C. for to 25 min, and then naturally recovering to room temperature to obtain the modified compatibilizer;

the polypropylene with a high melt flow index has a melt flow index of 800 to 900 g/10 min;

wherein, the weight ratio of polypropylene with a high melt flow index, maleic anhydride, methyl methacrylate, dicumyl peroxide, 1-dodecanethiol, 2-hydroxyethyl methacrylate, and sodium persulfate is (100 to 110):(5 to 6):(2 to 3):(0.5 to 0.8):(0.6 to 0.7):(3 to 4):(0.2 to 0.4).

The tackifier is prepared by the method as follows: mixing xanthan gum, cationic guar gum, and seaweed polysaccharide evenly, and placing the resultant in an airtight container, vacuumizing the airtight container until a degree of vacuum of 100 to 200 Pa, and then introducing oxygen, and controlling the gas pressure of oxygen in the airtight container at 70 to 90 kPa, and the temperature of the airtight container at 60° C. to 65° C., subjecting the resultant to a treatment at 60° C. to 65° C. for 40 to 45 min to obtain the tackifier;

wherein, the weight ratio of xanthan gum, cationic guar gum, and seaweed polysaccharide is (25 to 30):(15 to 20):(4 to 6).

The primary SM non-woven fabric is prepared as follows: heating and melting the meltblown non-woven fabric raw material, filtering the resulted melt, extruding the melt through a spinneret hole on a die head after distributing the melt, and obtaining a meltblown fiber by hot air stretching, spraying the meltblown fiber onto the spunbond non-woven fabrics to form a mesh to obtain the primary SM non-woven fabrics;

the temperatures in screw zone during the heating and melting process are 200° C. to 205° C., 210° C. to 215° C., and 230° C. to 235° C., respectively;

a filter temperature during the melt filtering process is 230° C. to 235° C.;

the temperature of the metering pump during the melt distributing process is 230° C. to 235° C., and the rotational speed is 25 to 30 rpm;

the wind temperature during the hot air stretching process is 200° C. to 210° C., and the rotational speed is 700 to 710 rpm, the mesh forming speed is 25 to 27 rpm;

the aperture of the spinneret hole is 0.45 to 0.55 mm; and the fiber diameter of the meltblown fiber is 10 to 12 μM.

In the post-processing process, the SM non-woven fabrics are obtained by spraying an active liquid on the surface of primary SM non-woven fabric at 40° C. to 45° C. with an usage amount of the active liquid controlled at 50 to 60 g/m$^2$, and drying at 40° C. to 45° C. after spraying to obtain SM non-woven fabrics;

the components of the active liquid, in parts by weight, comprise 100 to 110 parts of deionized water, 7 to 9 parts of maltodextrin, 5 to 6 parts of sodium tripolyphosphate, 2 to 3 parts of sodium dodecyl sulfate, and 0.2 to 0.5 parts of poly(diallyldimethylammonium chloride).

Compared with the Prior Art, the Beneficial Effects of the Present Application are as Follows:

(1) The preparation method of SM non-woven fabrics for roof anti-slip of the present application can avoid the problem that the SM non-woven fabrics cannot be fully bonded together and are easy to delaminate when being combined. The SM non-woven fabrics for roof anti-slip prepared by the present application are placed at a temperature of 38° C. and a humidity of 85% for 10 days, 20 days, 30 days, 60 days, and 90 days, tested according to ASTM D5035 with an elongation of 10%, and no delamination will occur;

(2) The preparation method of SM non-woven fabrics for roof anti-slip of the present application can solve the problem of fabric breakage occurred during high-speed production due to the different properties such as strengths of two types of non-woven fabric materials, and the inconsistent tensile tensions.

(3) The preparation method of SM non-woven fabrics for roof anti-slip of the present application can improve the wear resistance, strength, and stiffness of SM non-woven fabrics. The SM non-woven fabrics prepared by the present application have a lateral strength of 39 to 43 N, a longitudinal strength of 52 to 55 N, and a friction coefficient of 1.2 to 1.5;

(4) The SM non-woven fabrics for roof anti-slip prepared by the present application have a gram weight of 45 to 49 g/m$^2$, a porosity of 56 to 61%, a fiber fineness of 11 to 13 μm, an air permeability of 2900 to 3100 mm/s, and a thickness of 0.37 to 0.42 mm;

(5) The SM non-woven fabrics for roof anti-slip prepared by the present application have low production costs, are easy to recycle, and have good environmental performances.

SPECIFIC MODES FOR CARRYING OUT THE EMBODIMENTS

The specific embodiments of the present application are hereby explained for a clearer understanding of the technical features, objectives, and effects of the present application.

Example 1

A preparation method of SM non-woven fabrics for roof anti-slip, specifically as follows:
1. The preparation of spunbond non-woven fabric raw materials: polypropylene with a low melt flow index, polypropylene with a high melt flow index, sodium alginate, antioxidant 1010, zinc stearate, ultraviolet absorber UV-531, polyvinyl alcohol, reinforcing agent, adhesive agent, and nano titanium dioxide were mixed uniformly to obtain spunbond non-woven fabric raw materials;
   the polypropylene with a low melt flow index has a melt flow index of 25 g/10 min;
   the polypropylene with a high melt flow index has a melt flow index of 800 g/10 min;
   wherein, the weight ratio of the polypropylene with a low melt flow index, polypropylene with a high melt flow index, sodium alginate, antioxidant 1010, zinc stearate, ultraviolet absorber UV-531, polyethylene glycol 6000, reinforcing agent, adhesive agent, and nano titanium dioxide was 120:7:3:0.5:2:1:6:7:3:2.
   The reinforcing agent was prepared by the method as follows: hexagonal boron nitride powder, light calcium carbonate, hexadecyl trimethyl ammonium bromide, and sodium hexametaphosphate were placed in a ball mill for ball milling at a ball-to-material ratio of 20:1, a ball milling speed of 200 rpm, a temperature of 60° C. for 20 min, and after the ball milling ends, the primary reinforcing agent was obtained, and the primary reinforcing agent was subjected to vacuum heating treatment at a vacuum degree of 100 Pa, and a temperature of 70° C., and the reinforcing agent was obtained at the end of the vacuum heating treatment;
   wherein, the weight ratio of hexagonal boron nitride powder, light calcium carbonate, hexadecyl trimethyl ammonium bromide, and sodium hexametaphosphate was 20:8:3:7.
   The adhesive agent was prepared as follows: polyvinyl alcohol 2488, cyclodextrin, hydroxyethyl cellulose, and cationic polyacrylamide were added into deionized water, stirred at a stirring speed of 200 rpm for 40 min at 60° C., then the resultant was subjected to spray drying with an inlet air temperature controlled at 140° C., and an outlet air temperature controlled at 60° C., and the adhesive agent was obtained after vacuum spray drying;
   the molecular weight of the cationic polyacrylamide was 5 million, and the degree of ionicity was 15%;
   wherein, the weight ratio of polyvinyl alcohol 2488, cyclodextrin, hydroxyethyl cellulose, cationic polyacrylamide, and deionized water was 30:3:5:1:50.
2. The preparation of spunbond non-woven fabrics: spunbond non-woven fabric raw materials were added into a mixing device, and the resultant was subjected to melt extruding, melt filtering, die head spinning, mesh laying, hot rolling, liquid loading, drying, coiling and winding, and slitting to obtain spunbond non-woven fabrics;
   the pressure of the air box in the die head spinning step was 2800 Pa, the fan speed ratio was 80%, and the temperature of the upper and lower cold air was 22° C.;
   the temperature of the embossing roller in the hot rolling treatment step was 155° C., the temperature of the smooth roller was 140° C., the speed of the mesh belt was 630 m/min, and the hot rolling pressure was 80 daN/cm.
3. The preparation of meltblown non-woven fabric raw materials: polypropylene, polybutylene terephthalate, polyethylene, nano silicon dioxide, coconut monoisopropanolamide, modified compatibilizer, and tackifier were mixed uniformly to obtain meltblown non-woven fabric raw materials;
   the preparation method of the modified compatibilizer was as follows: a high melt flow index of polypropylene, maleic anhydride, and methyl methacrylate were added into a mixer for low-temperature treatment with a speed controlled at 250 rpm, and a temperature controlled at 2° C. for 20 min, dicumyl peroxide and 1-dodecanethiol were added, and then the temperature was raised to 40° C. at a heating rate of 1° C./min, the resultant was stirred at 40° C. for 15 min, 2-hydroxyethyl methacrylate and sodium persulfate were added, then the temperature was raised to 50° C. at a heating rate of 0.8° C./min, the resultant was stirred at 50° C. for 20 min, and naturally recovered to room temperature to obtain the modified compatibilizer;
   the polypropylene with a high melt flow index has a melt flow index of 800 g/10 min;
   wherein, the weight ratio of polypropylene with a high melt flow index, maleic anhydride, methyl methacrylate, dicumyl peroxide, 1-dodecanethiol, 2-hydroxyethyl methacrylate, and sodium persulfate was 100:5:2:0.5:0.6:3:0.2.
   The preparation method of the tackifier was as follows: xanthan gum, cationic guar gum, and seaweed polysaccharide were mixed evenly and placed in an airtight container, the airtight container was vacuumized until a degree of vacuum of 100 Pa, and then oxygen was introduced, the gas pressure of oxygen in the airtight container was controlled at 70 kPa, and the temperature of the airtight container was controlled at 60° C., the resultant was subjected to treatment at 60° C. for 40 min to obtain the tackifier;
   wherein, the weight ratio of xanthan gum, cationic guar gum, and seaweed polysaccharide was 25:15:4.
4. The preparation of the primary SM non-woven fabric: the meltblown non-woven fabric raw material was heated and melted, the resulted melt was filtered, the melt was extruded through the spinneret hole on the die head after distributing the melt, and the meltblown fiber was obtained by hot air stretching, the meltblown fiber was sprayed onto the spunbond non-woven fabrics prepared in step 2 to form a mesh to obtain the primary SM non-woven fabrics;
   the temperatures in the screw zone during the heating and melting process were 200° C., 210° C., and 230° C., respectively;
   the filter temperature during the melt filtering process was 230° C.;
   the temperature of the metering pump during the melt distributing process was 230° C., and the rotational speed was 25 rpm;
   the wind temperature during the hot air stretching process was 200° C., and the rotational speed was 7M) rpm;
   the mesh forming speed was 25 rpm;
   the aperture of the spinneret hole was 0.45 mm;
   the fiber diameter of the meltblown fiber was 10 μM.
5. The post-processing process: the active liquid was sprayed on the surface of primary SM non-woven fabric at 40° C. with a usage amount of the active liquid controlled at 50 g/m², and dried at 40° C. after spraying to obtain SM non-woven fabrics;

the components of the active liquid, in parts by weight, comprise 100 parts of deionized water, 7 parts of maltodextrin, 5 parts of sodium tripolyphosphate, 2 parts of sodium dodecyl sulfate, and 0.2 parts of poly(diallyldimethylammonium chloride).

No fabric breakage occurred during the preparation process in the present Example.

Example 2

A preparation method of SM non-woven fabrics for roof anti-slip, specifically as follows:
1. The preparation of spunbond non-woven fabric raw materials: polypropylene with a low melt flow index, polypropylene with a high melt flow index, sodium alginate, antioxidant 1010, zinc stearate, ultraviolet absorber UV-531, polyvinyl alcohol, reinforcing agent, adhesive agent, and nano titanium dioxide were mixed uniformly to obtain spunbond non-woven fabric raw materials;

the polypropylene with a low melt flow index has a melt flow index of 30 g/10 min;

the polypropylene with a high melt flow index has a melt flow index of 850 g/10 min;

wherein, the weight ratio of the polypropylene with a low melt flow index, polypropylene with a high melt flow index, sodium alginate, antioxidant 1010, zinc stearate, ultraviolet absorber UV-531, polyethylene glycol 6000, reinforcing agent, adhesive agent, and nano titanium dioxide was 125:8:4:0.6:3:1.5:7:8:3.5:3.

The reinforcing agent was prepared by the method as follows: hexagonal boron nitride powder, light calcium carbonate, hexadecyl trimethyl ammonium bromide, and sodium hexametaphosphate were placed in a ball mill for ball milling at a ball-to-material ratio during ball milling of 22:1, a ball milling speed of 250 rpm, a temperature of 62° C. for 25 min, and after the ball milling ends, the primary reinforcing agent was obtained, and the primary reinforcing agent was subjected to vacuum heating treatment at a vacuum degree of 110 Pa, and a temperature of 75° C., and the reinforcing agent was obtained at the end of the vacuum heating treatment:

wherein, the weight ratio of hexagonal boron nitride powder, light calcium carbonate, hexadecyl trimethyl ammonium bromide, and sodium hexametaphosphate was 21:9:4:8.

The adhesive agent was prepared as follows: polyvinyl alcohol 2488, cyclodextrin, hydroxyethyl cellulose, and cationic polyacrylamide were added into deionized water, stirred at a stirring speed of 220 rpm for 45 min at 62° C., then the resultant was subjected to spray drying with an inlet air temperature of spray drying controlled at 150° C., and an outlet air temperature controlled at 65° C., and the adhesive agent was obtained after vacuum spray drying;

the molecular weight of the cationic polyacrylamide was 5.5 million, and the degree of ionicity was 17%;

wherein, the weight ratio of polyvinyl alcohol 2488, cyclodextrin, hydroxyethyl cellulose, cationic polyacrylamide, and deionized water was 32:3.5:6:2:52.

2. The preparation of spunbond non-woven fabrics: spunbond non-woven fabric raw materials were added into a mixing device, and the resultant was subjected to melt extruding, melt filtering, die head spinning, mesh laying, hot rolling, liquid loading, drying, coiling and winding, and slitting to obtain spunbond non-woven fabrics;

the pressure of the air box in the die head spinning step was 2900 Pa, the fan speed ratio was 81%, and the temperature of the upper and lower cold air was 23° C.;

the temperature of the embossing roller in the hot rolling treatment step was 157° C., the temperature of the smooth roller was 142° C., the speed of the mesh belt was 640 m/min, and the hot rolling pressure was 85 daN/cm.

3. The preparation of meltblown non-woven fabric raw materials: polypropylene, polybutylene terephthalate, polyethylene, nano silicon dioxide, coconut monoisopropanolamide, modified compatibilizer, and tackifier were mixed uniformly to obtain meltblown non-woven fabric raw materials;

the preparation method of the modified compatibilizer was as follows: polypropylene with a high melt flow index, maleic anhydride, and methyl methacrylate were added into a mixer for low-temperature treatment with a speed controlled at 260 rpm, and a temperature controlled at 3° C. for 22 min, dicumyl peroxide and 1-dodecanethiol were added, and then the temperature was raised to 42° C. at a heating rate of 1.1° C./min, the resultant was stirred at 42° C. for 17 min, 2-hydroxyethyl methacrylate and sodium persulfate were added, then the temperature was raised to 52° C. at a heating rate of 0.9° C./min, the resultant was stirred at 52° C. for 22 min, and naturally recovered to room temperature to obtain the modified compatibilizer;

the polypropylene with a high melt flow index has a melt flow index of 850 g/10 min;

wherein, the weight ratio of polypropylene with a high melt flow index, maleic anhydride, methyl methacrylate, dicumyl peroxide, 1-dodecanethiol, 2-hydroxyethyl methacrylate, and sodium persulfate was 105:5.5:2.5:0.7:0.6:3.5:0.3.

The preparation method of the tackifier was as follows: xanthan gum, cationic guar gum, and seaweed polysaccharide were added evenly and placed in an airtight container, the airtight container was vacuumized until a degree of vacuum of 150 Pa, and then oxygen was introduced, the gas pressure of oxygen in the airtight container was controlled to 80 kPa. and the temperature of the airtight container was controlled at 62° C., the resultant was subjected to treatment at 62° C. for 42 min to obtain the tackifier:

wherein, the weight ratio of xanthan gum, cationic guar gum, and seaweed polysaccharide was 27:17:5.

4. The preparation of the primary SM non-woven fabric: the meltblown non-woven fabric raw material was heated and melted, the resulted melt was filtered, the melt was extruded through the spinneret hole on the die head after distributing the melt, and the meltblown fiber was obtained by hot air stretching, the meltblown fiber was sprayed onto the spunbond non-woven fabrics prepared in step 2 to form a mesh to obtain the primary SM non-woven fabrics;

the temperatures in the screw zone during the heating and melting process were 202° C. 212° C., and 232° C., respectively;

the filter temperature during the melt filtering process was 232° C.;

the temperature of the metering pump during the melt distributing process was 232° C., and the rotational speed was 27 rpm;

the wind temperature during the hot air stretching process was 205° C. and the rotational speed was 705 rpm;
the mesh forming speed was 26 rpm;
the aperture of the spinneret hole was 0.5 mm;
the fiber diameter of the meltblown fiber was 11 μM.
5. The post-processing process: the active liquid was sprayed on the surface of primary SM non-woven fabric at 42° C. with a usage amount of the active liquid controlled at 55 g/m², and dried at 42° C. after spraying to obtain SM non-woven fabrics;
the components of the active liquid, in parts by weight, comprise 105 parts of deionized water, 8 parts of maltodextrin, 5.5 parts of sodium tripolyphosphate, 2.5 parts of sodium dodecyl sulfate, and 0.3 parts of poly(diallyldimethylammonium chloride).

No fabric breakage occurred during the preparation process in the present Example.

Example 3

A preparation method of SM non-woven fabrics for roof anti-slip, specifically as follows:
1. The preparation of spunbond non-woven fabric raw materials: polypropylene with a low melt flow index, polypropylene with a high melt flow index, sodium alginate, antioxidant 1010, zinc stearate, ultraviolet absorber UV-531, polyvinyl alcohol, reinforcing agent, adhesive agent, and nano titanium dioxide were mixed uniformly to obtain spunbond non-woven fabric raw materials;
the polypropylene with a low melt flow index has a melt flow index of 35 g/10 min;
the polypropylene with a high melt flow index has a melt flow index of 900 g/10 min;
wherein, the weight ratio of the polypropylene with a low melt flow index, polypropylene with a high melt flow index, sodium alginate, antioxidant 1010, zinc stearate, ultraviolet absorber UV-531, polyethylene glycol 6000, reinforcing agent, adhesive agent, and nano titanium dioxide was 130:9:3:0.7:4:2:8:9:4:4.

The reinforcing agent was prepared by the method as follows: hexagonal boron nitride powder, light calcium carbonate, hexadecyl trimethyl ammonium bromide, and sodium hexametaphosphate were placed in a ball mill for ball milling at a ball-to-material ratio of 25:1, a ball milling speed of 300 rpm, a temperature of 65° C. for 30 min, and after the ball milling ends, the primary reinforcing agent was obtained, and the primary reinforcing agent was subjected to vacuum heating treatment at a vacuum degree of 120 Pa, and a temperature of 80° C., and the reinforcing agent was obtained at the end of the vacuum heating treatment;
wherein, the weight ratio of hexagonal boron nitride powder, light calcium carbonate, hexadecyl trimethyl ammonium bromide, and sodium hexametaphosphate was 22:10:5:10.

The adhesive agent was prepared as follows: polyvinyl alcohol 2488, cyclodextrin, hydroxyethyl cellulose, and cationic polyacrylamide were added into deionized water, stirred at a stirring speed of 240 rpm for 50 min at 65° C., then the resultant was subjected to spray drying with an inlet air temperature of spray drying controlled at 160° C., and an outlet air temperature controlled at 70° C., and the adhesive agent was obtained after vacuum spray drying;
the molecular weight of the cationic polyacrylamide was 6 million, and the degree of ionicity was 20%;
wherein, the weight ratio of polyvinyl alcohol 2488, cyclodextrin, hydroxyethyl cellulose, cationic polyacrylamide, and deionized water was 35:4:7:3:55.

2. The preparation of spunbond non-woven fabrics: spunbond non-woven fabric raw materials were added into a mixing device, and the resultant was subjected to melt extruding, melt filtering, die head spinning, mesh laying, hot rolling, liquid loading, drying, coiling and winding, and slitting to obtain spunbond non-woven fabrics;
the pressure of the air box in the die head spinning step was 3000 Pa, the fan speed ratio was 82%, and the temperature of the upper and lower cold air was 25° C.;
the temperature of the embossing roller in the hot rolling treatment step was 160° C., the temperature of the smooth roller was 145° C., the speed of the mesh belt was 650 m/min, and the hot rolling pressure was 90 daN/cm.

3. The preparation of meltblown non-woven fabric raw materials: polypropylene, polybutylene terephthalate, polyethylene, nano silicon dioxide, coconut monoisopropanolamide, modified compatibilizer, and tackifier were mixed uniformly to obtain meltblown non-woven fabric raw materials;
the preparation method of the modified compatibilizer was as follows: polypropylene with a high melt flow index, maleic anhydride, and methyl methacrylate were added into a mixer for low-temperature treatment with a speed controlled at 280 rpm, and a temperature controlled at 5° C. for 25 min, dicumyl peroxide and 1-dodecanethiol were added, and then the temperature was raised to 45° C. at a heating rate of 1.2° C./min, the resultant was stirred at 45° C. for 20 min, 2-hydroxyethyl methacrylate and sodium persulfate were added, then the temperature was raised to 55° C. at a heating rate of 1° C. min, the resultant was stirred at 55° C. for 25 min, and naturally recovered to room temperature to obtain the modified compatibilizer;
the polypropylene with a high melt flow index has a melt flow index of 900 g/10 min;
wherein, the weight ratio of polypropylene with a high melt flow index, maleic anhydride, methyl methacrylate, dicumyl peroxide, 1-dodecanethiol, 2-hydroxyethyl methacrylate, and sodium persulfate was 110:6:3:0.8:0.7:4:0.4.

The preparation method of the tackifier was as follows: xanthan gum, cationic guar gum, and seaweed polysaccharide were mixed evenly and placed in an airtight container, the airtight container was vacuumized until a degree of vacuum of 200 Pa. and then oxygen was introduced, the gas pressure of oxygen in the airtight container was controlled at 90 kPa, and the temperature of the airtight container was controlled at 65° C., the resultant was subjected to treatment at 65° C. for 45 min to obtain the tackifier;
wherein, the weight ratio of xanthan gum, cationic guar gum, and seaweed polysaccharide was 30:20:6.

4. The preparation of the primary SM non-woven fabric: the meltblown non-woven fabric raw material was heated and melted, the resulted melt was filtered, the melt was extruded through the spinneret hole on the die head after distributing the melt, and the meltblown fiber was obtained by hot air stretching, the meltblown fiber was sprayed onto the spunbond non-woven fabrics prepared in step 2 to form a mesh to obtain the primary SM non-woven fabrics;

the temperatures in the screw zone during the heating and melting process were 205° C., 215° C., and 235° C., respectively;

the filter temperature during the melt filtering process was 235° C.;

the temperature of the metering pump during the melt distributing process was 235° C., and the rotational speed was 30 rpm;

the wind temperature during the hot air stretching process was 210° C., and the rotational speed was 710 rpm;

the mesh forming speed was 27 rpm;

the aperture of the spinneret hole was 0.55 mm;

The fiber diameter of the meltblown fiber was 12 μM.

5. The post-processing process: the active liquid was sprayed on the surface of primary SM non-woven fabric at 45° C. with a usage amount of the active liquid controlled at 60 g/m², and dried at 45° C. after spraying to obtain SM non-woven fabrics;

the components of the active liquid, in parts by weight, comprise 110 parts of deionized water, 9 parts of maltodextrin, 6 parts of sodium tripolyphosphate, 3 parts of sodium dodecyl sulfate, and 0.5 parts of poly(diallyldimethylammonium chloride).

No fabric breakage occurred during the preparation process in the present Example.

Comparative Example 1

The preparation method of SM non-woven fabrics for roof anti-slip in Example 1 is adopted except that: in the preparation of the spunbond non-woven fabric raw materials of step 1, hexagonal boron nitride powder is used instead of the reinforcing agent.

In the present Comparative Example, fabric breakage occurred during the preparation of primary SM non-woven fabrics in step 4.

Comparative Example 2

The preparation method of SM non-woven fabrics for roof anti-slip in Example 1 is adopted except that: in the preparation of the spunbond non-woven fabric raw materials of step 1, polyvinyl alcohol 2488 is used instead of the adhesive agent.

In the present Comparative Example, no fabric breakage occurred during the preparation process.

Comparative Example 3

The preparation method of SM non-woven fabrics for roof anti-slip in Example 1 is adopted except that: in the preparation of the meltblown non-woven fabric raw materials of step 3, the addition of a modified compatibilizer is omitted.

In the present Comparative Example, fabric breakage occurred during the preparation of primary SM non-woven fabrics in step 4.

Comparative Example 4

The preparation method of SM non-woven fabrics for roof anti-slip in Example 1 is adopted except that: the post-processing of step 5 is omitted.

In the present Comparative Example, no fabric breakage occurred during the preparation process.

The SM non-woven fabrics for roof anti-slip prepared in Examples 1-3 and Comparative Examples 1-3 were placed at a temperature of 38° C. and a humidity of 85% for 10 days, 20 days, 30 days, 60 days, and 90 days, and then statistics analysis of the delamination situation was conducted, and the statistical results were as follows:

The gram weight, porosity, fiber fineness, air permeability, lateral strength, longitudinal strength, thickness, and friction coefficient of the SM non-woven fabrics for roof anti-slip prepared in Examples 1-3 and Comparative Examples 1-3 were tested. The test results were as follows:

| The situation of delamination | Example 1 | Example 2 | Example 3 | Comparative Example 1 | Comparative Example 2 | Comparative Example 3 | Comparative Example 4 | Testing method |
|---|---|---|---|---|---|---|---|---|
| After 10 days | No delamination | No delamination | No delamination | No delamination | No delamination | No delamination | No delamination | According to ASTM D5035 with an elongation of 10% qualified products |
| After 20 days | No delamination | No delamination | No delamination | No delamination | Delamination | No delamination | No delamination | |
| After 30 days | No delamination | No delamination | No delamination | No delamination | Delamination | Delamination | No delamination | |
| After 60 days | No delamination | No delamination | No delamination | No delamination | Delamination | Delamination | Delamination | |
| After 90 days | No delamination | No delamination | No delamination | No delamination | Delamination | Delamination | Delamination | |

|  | Example 1 | Example 2 | Example 3 | Comparative Example 1 | Comparative Example 2 | Comparative Example 3 | Comparative Example 4 | Testing standards |
|---|---|---|---|---|---|---|---|---|
| Gram Weight, g/m² | 48 | 49 | 45 | 49 | 46 | 51 | 49 | ASTM D3776-20 |
| Porosity, % | 56 | 61 | 57 | 58 | 54 | 53 | 54 | Scanner testing |
| Fiber fineness, μm | 13 | 12 | 11 | 13 | 10 | 15 | 11 | Scanning electron microscopy testing |
| Air permeability, mm/s | 3000 | 3100 | 2900 | 2800 | 2700 | 2600 | 2500 | ASTM D737-04 |
| Lateral strength, N | 40 | 43 | 39 | 42 | 141 | 34 | 37 | ASTM D5034-2017 |
| Longitudinal strength, N | 54 | 55 | 52 | 53 | 49 | 45 | 46 | ASTM D5034-2017 |
| Thickness, mm | 0.37 | 10.42 | 0.40 | 0.37 | 0.39 | 0.44 | 0.38 | ASTM D5736-95 |
| Friction coefficient | 1.2 | 1.5 | 1.3 | 1.1 | 0.5 | 1.0 | 0.6 | ASTM D1894-2014 |

Unless otherwise specified, the percentages used in the present application are all mass percentages.

Finally, it should be noted that the above are only preferred embodiments of the present application and are not intended to limit the present application. Although the present application has been described in detail with reference to the aforementioned embodiments, it is still possible for a person skilled in the art to modify the technical solutions described in the aforementioned embodiments or to equivalently replace some of their technical features. All these modifications, equivalent replacements, improvements and the like made within the spirit and principles of the present application fall into the protection scope of the present application.

INDUSTRIAL APPLICABILITY

The present application provides a preparation method for SM non-woven fabrics for roof anti-slip. The present application can avoid the problem that the SM non-woven fabrics cannot be fully bonded together and are easy to delaminate when being combined, can also solve the problem of fabric breakage during high-speed production, and can also improve the wear resistance, strength, and stiffness of SM non-woven fabrics. The prepared SM non-woven fabrics have low production costs, are easy to recycle, and have good environmental performances. The present application has broad application prospects and good industrial applicability in the field of roofing materials.

What is claimed is:

1. A preparation method of SM non-woven fabrics for roof anti-slip, characterized by comprising: preparing spunbond non-woven fabric raw materials, preparing spunbond non-woven fabrics, preparing meltblown non-woven fabric raw materials, preparing primary SM non-woven fabrics, and post-processing;

the spunbond non-woven fabric raw materials are prepared by uniformly mixing polypropylene with a low melt flow index, polypropylene with a high melt flow index, sodium alginate, antioxidant 1010, zinc stearate, ultraviolet absorber UV-531, polyethylene glycol 6000, reinforcing agent, adhesive agent, and nano titanium dioxide;

in the step of preparing spunbond non-woven fabric raw materials, the weight ratio of polypropylene with a low melt flow index, polypropylene with a high melt flow index, sodium alginate, antioxidant 1010, zinc stearate, ultraviolet absorber UV-531, polyethylene glycol 6000, reinforcing agent, adhesive agent and nano titanium dioxide is (120 to 130):(7 to 9):(3 to 5):(0.5 to 0.7):(2 to 4):(1 to 2):(6 to 8):(7 to 9):(3 to 4):(2 to 4);

the reinforcing agent is prepared by the method as follows: placing hexagonal boron nitride powder, light calcium carbonate, hexadecyl trimethyl ammonium bromide, and sodium hexametaphosphate in a ball mill for ball milling at a ball-to-material ratio of (20 to 25):1, a ball milling speed of 200 to 300 rpm, and a temperature of 60° C. to 65° C. for 20 to 30 min, and obtaining a primary reinforcing agent after the ball milling ends, subjecting the primary reinforcing agent to vacuum heating treatment at a vacuum degree of 100 to 120 Pa, and a temperature of 70° C. to 80° C., and obtaining the reinforcing agent at the end of the vacuum heating treatment;

wherein, the weight ratio of hexagonal boron nitride powder, light calcium carbonate, hexadecyl trimethyl ammonium bromide, and sodium hexametaphosphate is (20 to 22):(8 to 10):(3 to 5):(7 to 10);

the meltblown non-woven fabric raw materials are prepared as follows: uniformly mixing polypropylene, polybutylene terephthalate, polyethylene, nano silicon dioxide, coconut monoisopropanolamide, modified compatibilizer and tackifier to obtain meltblown non-woven fabric raw materials;

the modified compatibilizer is prepared by the method as follows: adding polypropylene with a high melt flow index, maleic anhydride, and methyl methacrylate into a mixer for low-temperature treatment with a speed controlled at 250 to 280 rpm, and a temperature controlled at 2° C. to 5° C. for 20 to 25 min, adding dicumyl peroxide and 1-dodecanethiol, and then raising the temperature to 40° C. to 45° C. at a heating rate of 1 to 1.2° C./min, stirring at 40° C. to 45° C. for 15 to 20 min, adding 2-hydroxyethyl methacrylate and sodium persulfate, then raising the temperature to 50° C. to 55° C. at a heating rate of 0.8 to 1° C./min, stirring at 50° C. to 55° C. for 20 to 25 min, and then naturally recovering to room temperature to obtain the modified compatibilizer;

in the preparation of the modified compatibilizer, the weight ratio of polypropylene with a high melt flow index, maleic anhydride, methyl methacrylate, dicumyl peroxide, 1-dodecanethiol, 2-hydroxyethyl methacrylate, and sodium persulfate is (100 to 110):(5 to 6):(2 to 3):(0.5 to 0.8):(0.6 to 0.7):(3 to 4):(0.2 to 0.4);

in the post-processing process, the SM non-woven fabrics are obtained by spraying an active liquid on the surface of primary SM non-woven fabric at 40° C. to 45° C. with a usage amount of the active liquid controlled at 50 to 60 g/m², and drying at 40° C. to 45° C. after spraying;

the components of the active liquid, in parts by weight, comprise 100 to 110 parts of deionized water, 7 to 9 parts of maltodextrin, 5 to 6 parts of sodium tripolyphosphate, 2 to 3 parts of sodium dodecyl sulfate, and 0.2 to 0.5 parts of poly(diallyldimethylammonium chloride).

2. The preparation method of SM non-woven fabrics for roof anti-slip of claim 1, wherein, the melt flow index of the polypropylene with a low melt flow index is 25 to 35 g/10 min; and the melt flow index of the polypropylene with a high melt flow index is 800 to 900 g/10 min.

3. The preparation method of SM non-woven fabrics for roof anti-slip of claim 1, wherein, the adhesive agent is prepared by the method as follows:

adding polyvinyl alcohol 2488, cyclodextrin, hydroxyethyl cellulose, and cationic polyacrylamide into deionized water, stirring at a stirring speed of 200 to 240 rpm for 40-50 min at 60° C. to 65° C., and then carrying out spray drying with an inlet air temperature controlled at 140° C. to 160° C., and an outlet air temperature controlled at 60° C. to 70° C., and obtaining the adhesive agent after spray drying;

the cationic polyacrylamide has a molecular weight of 5 to 6 million and a degree of ionicity of 15% to 20%;

wherein, the weight ratio of polyvinyl alcohol 2488, cyclodextrin, hydroxyethyl cellulose, cationic polyacrylamide and deionized water is (30 to 35):(3 to 4):(5 to 7):(1 to 3):(50 to 55).

4. The preparation method of SM non-woven fabrics for roof anti-slip of claim 1, wherein, the spunbond non-woven fabrics are prepared as follows:

adding spunbond non-woven fabric raw materials into a mixing device, and obtaining spunbond non-woven fabrics through melt extruding, melt filtering, die head spinning, mesh laying, hot rolling, liquid loading, drying, coiling and winding, and slitting;

in the die head spinning step, a pressure of an air box is 2800 to 3000 Pa, a fan speed ratio is 80% to 82%, and a temperature of upper and lower cold air is 22° C. to 25° C.;

in the hot rolling step, a temperature of embossing roller is 155° C. to 160° C., temperature of smooth roller is 140° C. to 145° C., a speed of mesh belt is 630 to 650 m/min, and a hot rolling pressure is 80 to 90 daN/cm.

5. The preparation method of SM non-woven fabrics for roof anti-slip of claim 1, wherein, the tackifier is prepared by the method as follows: mixing xanthan gum, cationic guar gum, and seaweed polysaccharide evenly, and placing the resultant in an airtight container, vacuumizing the airtight container until a degree of vacuum of 100 to 200 Pa, and then introducing oxygen, and controlling a gas pressure of oxygen in the airtight container at 70 to 90 kPa, and a temperature of the airtight container at 60° C. to 65° C., subjecting the resultant to a treatment at 60° C. to 65° C. for 40 to 45 min to obtain the tackifier;

wherein, the weight ratio of xanthan gum, cationic guar gum, and seaweed polysaccharide is (25 to 30):(15 to 20):(4 to 6).

6. The preparation method of SM non-woven fabrics for roof anti-slip of claim 1, wherein, the primary SM non-woven fabric is prepared as follows:

heating and melting the meltblown non-woven fabric raw material, filtering the resulted melt, extruding the melt through a spinneret hole on a die head after distributing the melt, and obtaining a meltblown fiber by hot air stretching, spraying the meltblown fiber onto the spunbond non-woven fabrics to form a mesh to obtain the primary SM non-woven fabrics;

temperatures in screw zone during the heating and melting are 200° C. to 205° C., 210° C. to 215° C., and 230° C. to 235° C., respectively;

filter temperature during the melt filtering is 230° C. to 235° C.;

a temperature of metering pump during melt distributing is 230° C. to 235° C., and rotational speed is 25 to 30 rpm;

a wind temperature during the hot air stretching is 200° C. to 210° C., and a rotational speed is 700 to 710 rpm;

a mesh forming speed is 25 to 27 rpm;

an aperture of spinneret hole is 0.45 to 0.55 mm; and a fiber diameter of the meltblown fiber is 10 to 12 μM.

* * * * *